United States Patent
Sato et al.

(10) Patent No.: US 9,528,675 B2
(45) Date of Patent: Dec. 27, 2016

(54) AUTOMOTIVE LAMP

(71) Applicants: KOITO MANUFACTURING CO., LTD., Minato-ku, Tokyo (JP); TOYOTA JIDOSHA KABUSHIKI KAISHA, Toyota-shi, Aichi (JP)

(72) Inventors: Yasushi Sato, Shizuoka (JP); Yuji Noritake, Toyota (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 14/777,988

(22) PCT Filed: Mar. 17, 2014

(86) PCT No.: PCT/JP2014/001496
§ 371 (c)(1),
(2) Date: Sep. 17, 2015

(87) PCT Pub. No.: WO2014/148030
PCT Pub. Date: Sep. 25, 2014

(65) Prior Publication Data
US 2016/0281950 A1 Sep. 29, 2016

(30) Foreign Application Priority Data
Mar. 22, 2013 (JP) ................. 2013-060932

(51) Int. Cl.
*F21S 8/10* (2006.01)
(52) U.S. Cl.
CPC .......... *F21S 48/1317* (2013.01); *F21S 48/115* (2013.01); *F21S 48/1388* (2013.01)

(58) Field of Classification Search
CPC ... F21S 48/1317; F21S 48/115; F21S 48/1388
(Continued)

(56) References Cited

U.S. PATENT DOCUMENTS

| 5,566,057 A | 10/1996 | Iwami |
| 6,089,736 A | 7/2000 | Tanaka |

(Continued)

FOREIGN PATENT DOCUMENTS

| CN | 201680262 U | 12/2010 |
| DE | 102007021865 A1 | 11/2008 |

(Continued)

OTHER PUBLICATIONS

International Search Report issued on Apr. 28, 2014, by the International Searching Authority in corresponding International Application No. PCT/JP2014/001496, with an English Language Translation of the Search Report. (2 pages).

(Continued)

*Primary Examiner* — Laura Tso
(74) *Attorney, Agent, or Firm* — Buchanan Ingersoll & Rooney PC

(57) ABSTRACT

An automotive lamp according to one embodiment includes: a first lamp unit that has a first projection lens; a second lamp unit that has a second projection lens and that lines up with the first lamp unit in a substantially horizontal direction and is arranged such that the second projection lens is located further to the back of the lamp than the first projection lens; and a reflex reflector that is provided in a region between the first projection lens and the second projection lens on a side surface of the first lamp unit on the side of the second lamp unit and that reflects light that enters from the outside of the lamp.

4 Claims, 2 Drawing Sheets

(58) Field of Classification Search
USPC .................................... 362/517, 538, 516
See application file for complete search history.

(56) References Cited

U.S. PATENT DOCUMENTS

| | | | |
|---|---|---|---|
| 2008/0231954 A1 | 9/2008 | Nishiyama | |
| 2011/0255298 A1 | 10/2011 | Lindsay et al. | |
| 2014/0268850 A1* | 9/2014 | Marley | F21S 48/1388 362/517 |
| 2016/0215952 A1* | 7/2016 | Dunn | F21S 48/34 |

FOREIGN PATENT DOCUMENTS

| | | |
|---|---|---|
| JP | 03107351 U | 11/1991 |
| JP | 11-213710 A | 8/1999 |
| JP | 2006286262 A | 10/2006 |
| JP | 2009054392 A | 3/2009 |
| JP | 2009152044 A | 7/2009 |
| JP | 2011233250 | 4/2010 |
| JP | 2010170891 A | 8/2010 |

OTHER PUBLICATIONS

International Preliminary Report on Patentability and Notification Concerning Transmittal of International Preliminary Report on Patentability (Forms PCT/IB/373 and PCT/IB/326) and the Written Opinion of the International Searching Authority (Form PCT/ISA/237) issued on Sep. 22, 2015, by the by the International Bureau of WIPO in corresponding International Application No. PCT/JP2014/001496, with an English Language Translation. (8 pages).

Extended European Search Report dated Oct. 10, 2016 issued in corresponding European Patent Appln. No. 14770157.7 (7 pages).

Chinese Office Action dated Nov. 1, 2016 issued in corresponding Chinese Patent Appln. No. 201480016732.8, with English translation (14 pages).

* cited by examiner

AUTOMOTIVE LAMP

1. Field of the Invention

The present invention relates to an automotive lamp and, more particularly, to an automotive lamp used in a vehicle such as an automobile.

2. Description of the Related Art

Patent document No. 1 discloses an automotive lamp in which reflex reflectors that reflect, toward the outside of the lamp, light entering from the outside of the lamp are provided on an internal surface of a lamp body (housing) and on a floodlight cover (outer lens). For example, the reflex reflectors reflect light radiated from a side direction of the own vehicle back toward the side direction. This allows another vehicle or the like located in the side direction to recognize the presence of this own vehicle.

[Patent document No. 1] Japanese Patent Application Publication No. 11-213710

If a reflex reflector is provided on a floodlight cover, the reflect reflector may interfere with light irradiation of an automotive lamp. In a case of providing a reflex reflector on a lamp body, it is necessary to implement a device such as, for example, extending a side wall of the lamp body toward the front of the lamp and providing the reflex reflector on this extended portion in order to turn a reflective surface of the reflex reflector to an incident direction of light that is to be reflected. Therefore, an increase in the size of the automotive lamp can be caused.

SUMMARY OF THE INVENTION

In this background, a purpose of the present invention is to provide a technology for suppressing degradation in a light irradiation function of an automotive lamp and an increase in the size of the automotive lamp that are caused when a reflex reflector is provided.

An embodiment of the present invention relates to an automotive lamp. The automotive lamp includes: a first lamp unit that has a first projection lens; a second lamp unit that has a second projection lens and that lines up with the first lamp unit in a substantially horizontal direction and is arranged such that the second projection lens is located further to the back of the lamp than the first projection lens; and a reflex reflector that is provided in a region between the first projection lens and the second projection lens on a side surface of the first lamp unit on the side of the second lamp unit and that reflects light that enters from the outside of the lamp.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
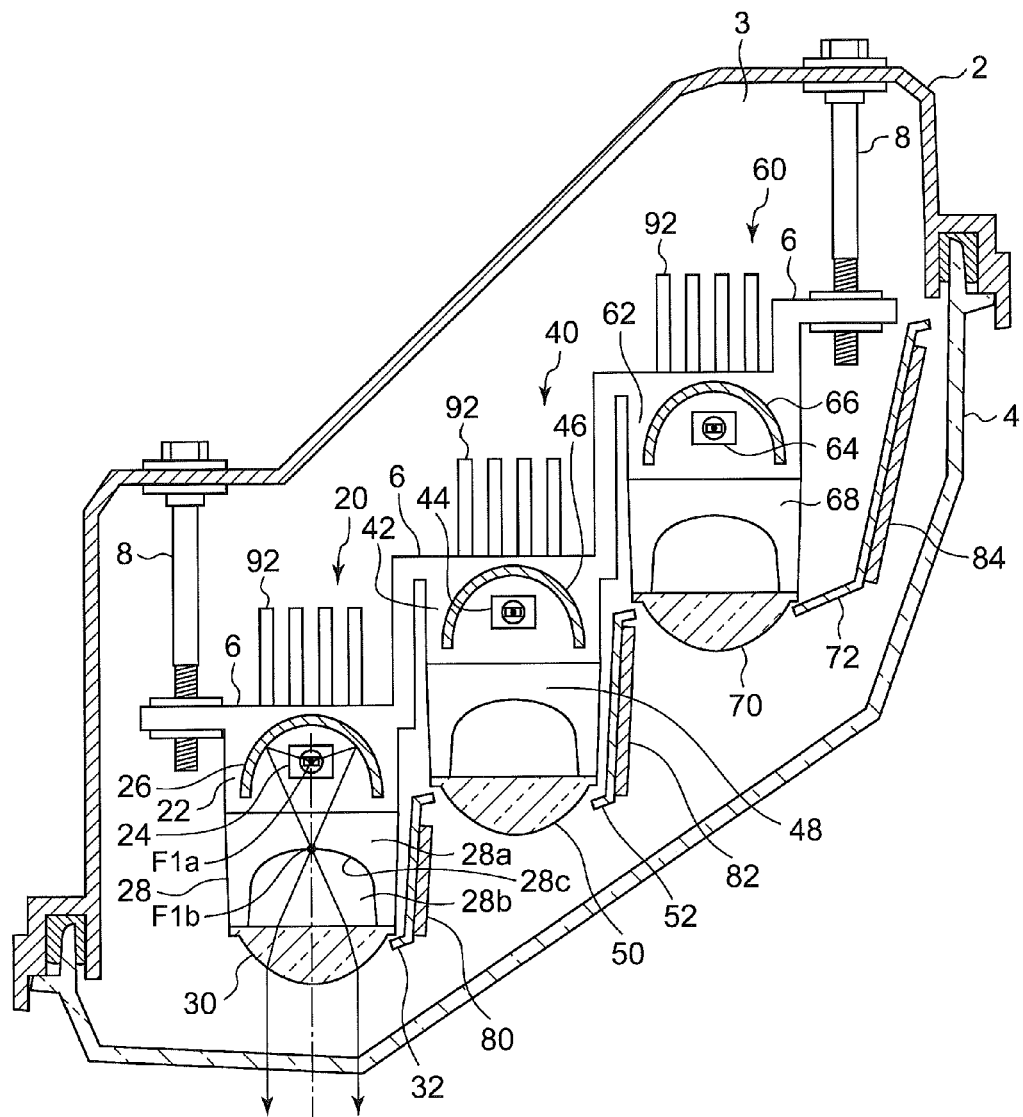
FIG. 1 is a horizontal cross sectional view illustrating a schematic structure of an automotive lamp according to an embodiment.

An embodiment of the present invention relates to an automotive lamp. The automotive lamp includes: a first lamp unit that has a first projection lens; a second lamp unit that has a second projection lens and that lines up with the first lamp unit in a substantially horizontal direction and is arranged such that the second projection lens is located further to the back of the lamp than the first projection lens; and a reflex reflector that is provided in a region between the first projection lens and the second projection lens on a side surface of the first lamp unit on the side of the second lamp unit and that reflects light that enters from the outside of the lamp.

According to this embodiment, degradation in a light irradiation function of the automotive lamp and an increase in the size of the automotive lamp that are caused when the reflex reflector is provided can be suppressed.

In the above embodiment, the automotive lamp may further include: a third lamp unit that has a third projection lens and that lines up with the second lamp unit in a substantially horizontal direction and is arranged such that the third projection lens is located further to the back of the lamp than the second projection lens; and, when the reflex reflector provided on the side surface of the first lamp unit is referred to as a first reflex reflector, a second reflex reflector that is provided in a region between the second projection lens and the third projection lens on a side surface of the second lamp unit on the side of the third lamp unit. This allows the existence of the own vehicle to be more easily recognized by another vehicle or the like. The first lamp unit may have a first extension member that constitutes the side surface on the side of the second lamp unit. The second lamp unit may have a second extension member that constitutes the side surface on the side of the third lamp unit. The first reflex reflector may be provided on the first extension member. The second reflex reflector may be provided on the second extension member. This allows the reflex reflectors to be easily fixed. The first extension member and the second extension member may be formed integrally. This allows the number of components of the automotive lamp to be reduced and thus allows steps for assembly of the automotive lamp to be simplified.

A description will be given of an embodiment of the present invention with reference to the drawings. The same or equivalent constituting elements, members, and processes illustrated in each drawing shall be denoted by the same reference numerals, and duplicative explanations will be omitted appropriately. Reference herein to details of the illustrated embodiments is not intended to limit the scope of the claims. It should be understood that not all of the features and the combination thereof discussed are essential to the invention.

FIG. 1 is a horizontal cross sectional view illustrating a schematic structure of an automotive lamp according to an embodiment. An automotive lamp 1 according to the present embodiment is an automotive headlamp apparatus that has a pair of headlamp units disposed on the left and right of the front of a vehicle. The pair of headlamp units have substantially the same structure other than having structures that are bilaterally symmetrical. Thus, the structure of one of the headlamp units is shown as the automotive lamp 1 in FIG. 1.

The automotive lamp 1 is provided with a lamp body 2 that has an opening on a frontward side of the vehicle and a translucent cover 4 that is attached to cover the opening of the lamp body 2. The translucent cover 4 is formed of a resin, glass, or the like that is translucent. A lamp chamber 3, which is formed by the lamp body 2 and the translucent cover 4, contains a first lamp unit 20, a second lamp unit 40, a third lamp unit 60, a first reflex reflector 80 (a reflex reflector provided on a side surface of the first lamp unit 20), a second reflex reflector 82, and a third reflex reflector 84.

In the lamp chamber 3, the first lamp unit 20, the second lamp unit 40, and the third lamp unit 60 are each supported by a bracket 6. In the present embodiment, the first lamp unit 20 through the third lamp unit 60 are supported by the common bracket 6. The bracket 6 is a plate member that is bent in a step-like manner. One end of the bracket 6 (the left side in FIG. 1) and the other end of the bracket 6 (the right side in FIG. 1) are positioned such that the other end is located further to the back of the lamp than the one end. The bracket 6 is disposed such that main surfaces thereof are directed in the front-back direction of the lamp. A thread hole is provided in a peripheral portion of the bracket 6, and an aiming screw 8 that projects from a wall surface of the lamp body 2 toward the front of the lamp is threadably engaged with this thread hole. In the automotive lamp 1, the respective optical axes of the first lamp unit 20 through the third lamp unit 60 are adjustable in the vertical and the horizontal directions using the aiming screw 8. The supporting structure of the first lamp unit 20 through the third lamp unit 60 is not particularly limited to this.

The first lamp unit 20 is a reflective-type lamp unit and has a first light source mounting portion 22, a first light source 24, a first reflector 26, a first shade member 28, a first projection lens 30, and a first extension member 32. The first light source mounting portion 22 projects toward the front of the lamp from a lamp front side surface of an arbitrary step (the frontmost step in the present embodiment) of the step-like bracket 6, and the first light source 24 is mounted on the upper surface thereof. In the present embodiment, the first light source mounting portion 22 and the bracket 6 are formed integrally. A heat radiating fin 92 is provided on the rear surface side of the first light source mounting portion 22 in the bracket 6. The first light source 24 is, for example, a white light-emitting diode (while LED) and has a light emitting device and a substrate that supports this light emitting device. The substrate is a thermally conductive insulating substrate formed of a ceramic or the like. An electrode (not shown) that transmits electric power to the light emitting device is formed in the substrate.

The first reflector 26 has a substantially dome shape and is fixed to the first light source mounting portion 22 such that the first reflector 26 covers the first light source 24. A reflective surface is formed on the inside of the first reflector 26. The reflective surface is constituted by a part of an ellipsoid of revolution and has a focal point F1a and a focal point F1b located further to the front of the lamp than the focal point Fla. The first shade member 28 has a planar part 28a that is disposed approximately horizontally and a bent part 28b that is bent downward in a recessed manner at a position further to the front of the lamp than the planar part 28a. The first reflector 26 is arranged such that the focal point F1a of the reflective surface is positioned near the first light source 24 and such that the focal point F1b is positioned near a ridge line 28c formed by the planar part 28a and the bent part 28b of the first shade member 28.

The first projection lens 30 is constituted of a plano-convex lens having a convex front surface and a plane rear surface. The first projection lens 30 projects, as an inverted image, a light source image formed on a rear focal plane including a rear focal point of the first projection lens 30 onto a virtual vertical screen in front of the lamp. The first projection lens 30 is disposed such that the rear focal point overlaps with the focal point F1b and is fixed to the tip of the first shade member 28. The first lamp unit 20 is a lamp unit for forming a low beam light distribution pattern. The ridge line 28c of the first shade member 28 has a shape that corresponds to a cutoff line of a light distribution pattern formed by the first lamp unit 20. Light that is radiated from the first light source 24 is reflected toward the focal point F1b by the reflective surface. Then, a portion of the light is selectively cut by the first shade member 28, and the remaining portion enters the first projection lens 30. The light that has entered the first projection lens 30 is radiated toward the front of the lamp from the first projection lens 30.

The second lamp unit 40 is a reflective-type lamp unit and has a second light source mounting portion 42, a second light source 44, a second reflector 46, a second shade member 48, a second projection lens 50, and a second extension member 52. The second light source mounting portion 42 projects toward the front of the lamp from a lamp front side surface of a step (the middle step in the present embodiment) of the bracket 6 that is adjacent to the step on which the first light source mounting portion 22 is provided and that is located toward the back of the lamp, and the second light source 44 is mounted on the upper surface thereof. A heat radiating fin 92 is provided on the rear surface side of the second light source mounting portion 42 in the bracket 6. In the present embodiment, the second light source mounting portion 42 and the bracket 6 are formed integrally. The second light source 44 has the same configuration as that of the first light source 24.

The second reflector 46, the second shade member 48, and the second projection lens 50 have the same structures as the respective structures of the first reflector 26, the first shade member 28, and the first projection lens 30, respectively, and are arranged in the same positional relationship. The second lamp unit 40 is a lamp unit for forming a low beam light distribution pattern. Light that is radiated from the second light source 44 is reflected by the reflective surface of the second reflector 46. Then, a portion of the light is selectively cut by the second shade member 48, and the remaining portion enters the second projection lens 50. The light that has entered the second projection lens 50 is radiated toward the front of the lamp from the second projection lens 50.

The third lamp unit 60 is a reflective-type lamp unit and has a third light source mounting portion 62, a third light source 64, a third reflector 66, a third shade member 68, a third projection lens 70, and a third extension member 72. The third light source mounting portion 62 projects toward the front of the lamp from a lamp front side surface of a step (the backmost step in the present embodiment) of the bracket 6 that is adjacent to the step on which the second light source mounting portion 42 is provided and that is located toward the back of the lamp, and the third light source 64 is mounted on the upper surface thereof. A heat radiating fin 92 is provided on the rear surface side of the third light source mounting portion 62 in the bracket 6. In the present embodiment, the third light source mounting portion 62 and the bracket 6 are formed integrally. The third light source 64 has the same configuration as that of the first light source 24.

The third reflector 66, the third shade member 68, and the third projection lens 70 have the same structures as the respective structures of the first reflector 26, the first shade member 28, and the first projection lens 30, respectively, and are arranged in the same positional relationship. The third lamp unit 60 is a lamp unit for forming a low beam light distribution pattern. Light that is radiated from the third light source 64 is reflected by the reflective surface of the third reflector 66. Then, a portion of the light is selectively cut by the third shade member 68, and the remaining portion enters the third projection lens 70. The light that has entered the third projection lens 70 is radiated toward the front of the lamp from the third projection lens 70.

The second lamp unit 40 lines up with the first lamp unit 20 in a substantially horizontal direction and is arranged such that the second projection lens 50 is located further to the back of the lamp than the first projection lens 30 when viewed from above in the lamp. The third lamp unit 60 lines up with the second lamp unit 40 in a horizontal direction and is arranged such that the third projection lens 70 is located further to the back of the lamp than the second projection lens 50 when viewed from above in the lamp.

The first extension member 32 of the first lamp unit 20 is fixed to the bracket 6 and covers a region that is lateral to the first lamp unit 20 on the side of the second lamp unit 40 and that is located between the first projection lens 30 and the second projection lens 50 in the front-back direction of the lamp. Therefore, the first extension member 32 constitutes a side surface of the first lamp unit 20 on the side of the second lamp unit 40. The first extension member 32 may also cover the upper surface of the first lamp unit 20 and another region such as a region on a side of the first lamp unit 20 that is on the side opposite to the second lamp unit 40.

The second extension member 52 of the second lamp unit 40 is fixed to the bracket 6 and covers a region that is lateral to the second lamp unit 40 on the side of the third lamp unit 60 and that is located between the second projection lens 50 and the third projection lens 70 in the front-back direction of the lamp. Therefore, the second extension member 52 constitutes a side surface of the second lamp unit 40 on the side of the third lamp unit 60. The second extension member 52 may also cover another region such as the upper surface of the second lamp unit 40.

The third extension member 72 of the third lamp unit 60 is fixed to the bracket 6 and covers a region that is lateral to the third lamp unit 60 on the side opposite to the second lamp unit 40 and that is located further to the back of the lamp than the third projection lens 70. Therefore, the third extension member 72 constitutes a side surface of the third lamp unit 60. The third extension member 72 may also cover another region such as the upper surface of the third lamp unit 60.

The first reflex reflector 80, the second reflex reflector 82, and the third reflex reflector 84 are each formed of a retroreflective surface that reflects, in an incidence direction, light that enters from the outside of the lamp via the translucent cover 4. In the present embodiment, each of the reflex reflectors reflects light that enters from the side direction of the vehicle. The first reflex reflector 80 is provided in a region located between the first projection lens 30 and the second projection lens 50 on a side surface of the first lamp unit 20 on the side of the second lamp unit 40. The region in which the first reflex reflector 80 is provided is the region located between the first projection lens 30 and the second projection lens 50 in the front-back direction of the lamp. In the present embodiment, the first reflex reflector 80 is provided on the first extension member 32.

The second reflex reflector 82 is provided in a region located between the second projection lens 50 and the third projection lens 70 on a side surface of the second lamp unit 40 on the side of the third lamp unit 60. The region in which the second reflex reflector 82 is provided is the region located between the second projection lens 50 and the third projection lens 70 in the front-back direction of the lamp. In the present embodiment, the second reflex reflector 82 is provided on the second extension member 52. The third extension member 72 is provided in a region located further to the back of the lamp than the third projection lens 70 on a side surface of the third lamp unit 60 on the side opposite to the second lamp unit 40. In the present embodiment, the third reflex reflector 84 is provided on the third extension member 72.

As described, in the present embodiment, the plurality of lamp units are arranged to form steps in the front-back direction of the lamp, and the reflex reflectors are arranged on respective surfaces facing a lateral side of the lamp that are created by the steps. This allows for the prevention of the interference, which is caused by the reflex reflectors, with the travelling of light radiated from each of the projection lenses toward the front of the lamp. Also, there is no need to provide a region for providing the reflex reflectors in the lamp body 2, an increase in the size of the automotive lamp can be prevented. Since the reflex reflectors are arranged at a plurality of sites, the total area of the reflex reflectors can be increased, thus allowing the existence of the own vehicle to be more easily recognized by another vehicle or the like. Further, the automotive lamp 1 is able to have a novel design. Since the reflex reflectors are provided on the respective extension members, the reflex reflectors can be easily fixed.

The shape of the respective low beam light distribution patterns formed by the first lamp unit 20 through the third lamp unit 60 is publicly known. Thus, a detailed description thereof is omitted. The first lamp unit 20 through the third lamp unit 60 may respectively form partial light distribution patterns that are light distribution patterns different from one another and each of which constitutes a portion of a low beam light distribution pattern, and these partial light distribution patterns may be synthesized to form the low beam light distribution pattern. Differences in shape in the partial light distribution patterns formed by the respective lamp units can be achieved by adjusting the respective shapes of the reflective surfaces of reflectors, the ridge lines of the respective shade members, the projection lenses, and the like of the respective lamp units. Since a method used therefor is publicly known, a detailed description thereof is omitted.

As explained above, the second lamp unit 40 lines up with the first lamp unit 20 in a substantially horizontal direction and is arranged such that the second projection lens 50 is located further to the back of the lamp than the first projection lens 30 in the automotive lamp 1 according to the present embodiment. The first reflex reflector 80 is provided in a region located between the first projection lens 30 and the second projection lens 50 on a side surface of the first lamp unit 20 on the side of the second lamp unit 40. This allows for the prevention of the interference, which is caused by the reflex reflectors, with the travelling of light radiated from each of the lamp units. Also, hindrance to the miniaturization of the automotive lamp that is caused by the reflex reflectors can be prevented. Therefore, degradation in a light irradiation function of the automotive lamp and an increase in the size of the automotive lamp that are caused when the reflex reflectors are provided can be suppressed. Further, the automotive lamp is able to have novel appearance, and the design of the automotive lamp can thus be improved.

The first lamp unit 20 through the third lamp unit 60 are so-called projector optical systems. Therefore, the light utilization rate can be increased compared to a so-called parabola optical system. Thereby, the first lamp unit 20 through the third lamp unit 60 are likely to have an elongated shape when viewed from the front of the lamp.

The invention is not limited to the above-mentioned embodiments, and various modifications, such as a design change, may be added thereto on the basis of knowledge of those skilled in the art. It should be understood that any embodiment to which one or more of the modifications are added is also included in the scope of the invention. New embodiments resulting from the addition of modifications to the aforementioned embodiments will provide the advantages of the embodiments and modifications combined.

(Exemplary Variation)

An automotive lamp 1 according to an exemplary variation has a structure that is similar to that of the automotive lamp 1 according to the embodiment except that each lamp unit has a different shape and that a first extension member 32 through a third extension member 72 are formed integrally. An explanation will be given in the following regarding an automotive lamp according to the present exemplary variation with a focus on differences from the embodiment. The features that are identical to those of the embodiment are denoted by the same numerals, and a description or illustration thereof is omitted.

Figure 2:
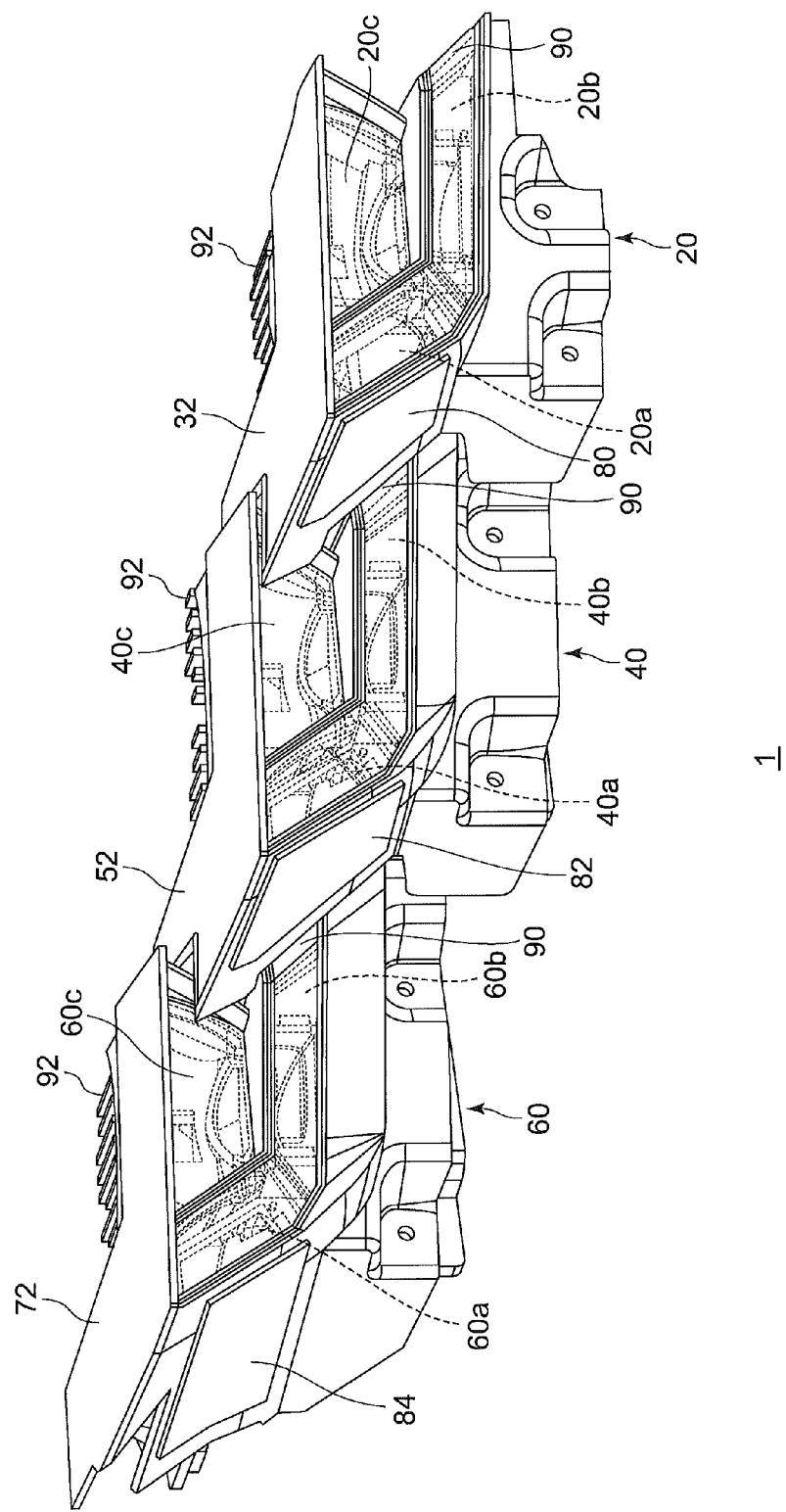
FIG. 2 is a perspective view illustrating a schematic structure of an automotive lamp according to an exemplary variation.

FIG. 2 is a perspective view illustrating a schematic structure of an automotive lamp according to the exemplary variation. In FIG. 2, the illustration of a lamp body 2 and a translucent cover 4 is omitted. In the automotive lamp 1 according to the exemplary variation, a first lamp unit 20 through a third lamp unit 60 have first lamp subunits 20*a*, 40*a*, and 60*a*, second lamp subunits 20*b*, 40*b*, and 60*b*, and third lamp subunits 20*c*, 40*c*, and 60*c*, respectively. The first lamp subunits 20*a*, 40*a*, and 60*a* and the second lamp subunits 20*b*, 40*b*, and 60*b* are each a reflective-type lamp unit and have a structure that is similar to that of the above-described first lamp unit 20 according to the embodiment. The third lamp subunit 20*c* is, for example, a direct-projection type lamp unit and has a light source mounting portion, a light source, a lens holder portion, and a projection lens. The structure of the direct-projection type lamp unit is publicly known. Thus, a detailed description thereof is omitted.

The first extension member 32 has an opening in a region where the respective projection lenses of the first lamp subunit 20*a*, the second lamp subunit 20*b*, and the third lamp subunit 20*c* exist and covers the periphery of the first lamp unit 20. The second extension member 52 has an opening in a region where the respective projection lenses of the first lamp subunit 40*a*, the second lamp subunit 40*b*, and the third lamp subunit 40*c* exist and covers the periphery of the second lamp unit 40. The third extension member 72 has an opening in a region where the respective projection lenses of the first lamp subunit 60*a*, the second lamp subunit 60*b*, and the third lamp subunit 60*c* exist and covers the periphery of the third lamp unit 60. In the present exemplary variation, the first extension member 32, the second extension member 52, and the third extension member 72 are formed integrally. Thereby, the number of components of the automotive lamp 1 can be reduced, and steps for assembly of the automotive lamp 1 can thus be simplified.

Inter-lens region illumination lenses 90 are provided respectively in the openings in the first extension member 32 through the third extension member 72 located in the respective regions where the respective projection lenses of the first lamp subunits 20*a*, 40*a*, and 60*a* and the second lamp subunits 20*b*, 40*b*, and 60*b* exist. The inter-lens region illumination lenses 90 are arranged such that the inter-lens region illumination lenses 90 cover the respective projection lenses of the first lamp subunits 20*a*, 40*a*, and 60*a* and the respective projection lenses of the second lamp subunits 20*b*, 40*b*, and 60*b* when viewed from the front of the lamp. The inter-lens region illumination lenses 90 function as optical members that emit a portion of light emitted from at least one of the first lamp subunits 20*a*, 40*a*, and 60*a* and the second lamp subunits 20*b*, 40*b*, and 60*b*, respectively, toward the front of the lamp through regions between the respective projection lenses of the first lamp subunits 20*a*, 40*a*, and 60*a* and the respective projection lenses of the second lamp subunits 20*b*, 40*b*, and 60*b*, respectively.

In other words, the automotive lamp 1 guides a portion of light emitted from at least either one of two lamp units to a region that covers between the two lamp units in an inter-lens region illumination lens 90 by internal reflection or the like in the inter-lens region illumination lens 90 and emits the portion of the light toward the front of the lamp through the region. This allows the respective regions between the first lamp subunits 20*a*, 40*a*, and 60*a* and the second lamp subunits 20*b*, 40*b*, and 60*b* to become luminous when viewed from the outside of the lamp in the automotive lamp 1. Therefore, the first lamp subunits 20*a*, 40*a*, and 60*a* and the second lamp subunits 20*b*, 40*b*, and 60*b* can be easily viewed as one continuous light-emitting unit. Further, the inter-lens region illumination lens 90 covers the entirety of the respective projection lenses of the two lamp units when viewed from the front of the lamp. Thereby, a sense of unity between the two lamp units can be further increased.

The respective inter-lens region illumination lenses 90 and the first extension member 32, the second extension member 52, and the third extension member 72 can be formed, for example, as described in the following. In other words, using a translucent resin material or the like, an integrally molded article is created that includes a portion having the shape of an inter-lens region illumination lens 90 and a portion having the shape of each extension member. By performing surface treatment such as vapor-deposition of metal, application of coating, or the like on the surface of a portion that is to become the extension member in the integrally molded article, the inter-lens region illumination lens 90 and the extension member can be formed.

The respective projection lenses of the first lamp subunits 20*a*, 40*a*, and 60*a* each have vertically long shape, and the respective projection lenses of the second lamp subunits 20*b*, 40*b*, and 60*b* each have a horizontally long shape. The projection lenses are arranged such that one end of each of the projection lenses is adjacent to one end of each of the respective projection lenses. In the present exemplary variation, a substantially L shape is formed by two projection lenses. This allows for the implementation of design where a dead space in the lamp chamber is reduced compared to a case of an automotive lamp that has a projection lens having a substantially perfect circle shape when viewed from the front of the lamp. Also, the degree of freedom in the arrangement of lamp units can be increased. Further, the automotive lamp 1 is able to have novel appearance, and the design of the automotive lamp 1 can thus be improved.

(Another Exemplary Variation)

The first light source 24, the second light source 44, and the third light source 64 may be light sources other than LED's such as incandescent lamps, electric-discharge lamps, or the like. The automotive lamp 1 has three lamp units. However, the number of lamp units is not particularly limited as long as two or more lamp units are provided. The first lamp unit 20 through the third lamp unit 60 may be direct-projection type lamp units. A light distribution pattern formed by each of the lamp units is not limited to a low beam light distribution pattern.

The invention according to the above-described embodiment may be specified by the items described in the following.

(Item 1) An automotive lamp including:

a first lamp unit that has a first projection lens;

a second lamp unit that has a second projection lens and that lines up with the first lamp unit in a substantially horizontal direction and is arranged such that the second projection lens is located further to the back of the lamp than the first projection lens; and a reflex reflector that is provided in a region between the first projection lens and the second projection lens on a side surface of the first lamp unit on the side of the second lamp unit and that reflects light that enters from the outside of the lamp.

(Item 2) The automotive lamp according to Item 1, further including:

an i-th lamp unit (i is an integer of three or more) that has an i-th projection lens and that lines up with an (i−1)th lamp unit in a substantially horizontal direction and is arranged such that the i-th projection lens is located further to the back of the lamp than an (i−1)th projection lens of the (i−1)th lamp unit; and an (i−1)th reflex reflector that is provided in a region between the (i−1)th projection lens and the i-th projection lens on a side surface of the (i−1)th lamp unit on the side of the i-th lamp unit.

(Item 3) The automotive lamp according to Item 2,
wherein the first lamp unit through the (i−1)th lamp unit have respective extension members that constitute the side surfaces, and
wherein the reflex reflectors are provided on the respective extension members.

(Item 4) The automotive lamp according to Item 3,
wherein the extension members are formed integrally.

The invention claimed is:

1. An automotive lamp comprising:
a first lamp unit that has a first projection lens;
a second lamp unit that has a second projection lens and that lines up with the first lamp unit in a substantially horizontal direction and is arranged such that the second projection lens is located further to the back of the lamp than the first projection lens; and
a reflex reflector that is provided in a region between the first projection lens and the second projection lens on a side surface of the first lamp unit on the side of the second lamp unit and that reflects light that enters from the outside of the lamp.

2. The automotive lamp according to claim 1, further comprising:
a third lamp unit that has a third projection lens and that lines up with the second lamp unit in a substantially horizontal direction and is arranged such that the third projection lens is located further to the back of the lamp than the second projection lens; and,
when the reflex reflector provided on the side surface of the first lamp unit is referred to as a first reflex reflector, a second reflex reflector that is provided in a region between the second projection lens and the third projection lens on a side surface of the second lamp unit on the side of the third lamp unit.

3. The automotive lamp according to claim 2,
wherein the first lamp unit has a first extension member that constitutes the side surface on the side of the second lamp unit,
wherein the second lamp unit has a second extension member that constitutes the side surface on the side of the third lamp unit,
wherein the first reflex reflector is provided on the first extension member, and
wherein the second reflex reflector is provided on the second extension member.

4. The automotive lamp according to claim 3,
wherein the first extension member and the second extension member are formed integrally.

* * * * *

UNITED STATES PATENT AND TRADEMARK OFFICE
CERTIFICATE OF CORRECTION

PATENT NO. : 9,528,675 B2  
APPLICATION NO. : 14/777988  
DATED : December 27, 2016  
INVENTOR(S) : Sato et al.

Page 1 of 1

It is certified that error appears in the above-identified patent and that said Letters Patent is hereby corrected as shown below:

On the Title Page

First Column, item (73) Assignee: after KOITO MANUFACTURING CO., LTD., Minato-ku, Tokyo (JP) insert -- ; TOYOTA JIDOSHA KABUSHIKI KAISHA, Toyota-shi, Aichi (JP) --.

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*